United States Patent
Arase

(10) Patent No.: US 10,547,815 B2
(45) Date of Patent: Jan. 28, 2020

(54) BIRD'S-EYE VIEW VIDEO GENERATION DEVICE, BIRD'S-EYE VIEW VIDEO GENERATION METHOD AND NON-TRANSITORY STORAGE MEDIUM

(71) Applicant: JVC KENWOOD Corporation, Yokohama-shi, Kanagawa (JP)

(72) Inventor: Takayuki Arase, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 14 days.

(21) Appl. No.: 15/906,049

(22) Filed: Feb. 27, 2018

(65) Prior Publication Data
US 2018/0255274 A1    Sep. 6, 2018

(30) Foreign Application Priority Data
Mar. 2, 2017   (JP) ................. 2017-039675

(51) Int. Cl.
*H04N 7/18*   (2006.01)
*H04N 5/232*   (2006.01)
*G06T 3/00*   (2006.01)

(52) U.S. Cl.
CPC ........... *H04N 7/181* (2013.01); *G06T 3/0012* (2013.01); *H04N 5/23238* (2013.01)

(58) Field of Classification Search
CPC ... H04N 7/181; H04N 5/23238; G06T 3/0012
(Continued)

(56) References Cited

U.S. PATENT DOCUMENTS

2011/0032374 A1 *   2/2011   Imanishi .................. B60R 1/00
                                                    348/222.1
2015/0022664 A1 *   1/2015   Pflug ..................... H04N 7/181
                                                    348/148
(Continued)

FOREIGN PATENT DOCUMENTS

JP        2007-266930         10/2007
JP        2007266930 A    *   10/2007
(Continued)

*Primary Examiner* — Joseph G Ustaris
*Assistant Examiner* — Matthew David Kim
(74) *Attorney, Agent, or Firm* — Amin, Turocy & Watson, LLP

(57) ABSTRACT

A bird's-eye view video generation device includes a video data acquisition unit configured to acquire surroundings video data by capturing videos of surroundings of a vehicle, an inclination data acquisition unit configured to acquire inclination data representing an inclination of the vehicle, a bird's-eye view video generator configured to perform viewpoint conversion processing on the videos of the surroundings using a virtual viewpoint at which the vehicle is looked down from above and synthesize the converted videos of the surroundings to generate a bird's-eye view video, and a controller configured to cause the bird's-eye view video generator to perform the viewpoint conversion processing on the videos of the surroundings using the virtual viewpoint whose position is adjusted based on the inclination data acquired by the inclination data acquisition unit and synthesize the converted videos of the surroundings of the vehicle to generate the bird's-eye view video.

4 Claims, 6 Drawing Sheets

(58) Field of Classification Search
USPC .......................................................... 348/148
See application file for complete search history.

(56) References Cited

U.S. PATENT DOCUMENTS

2016/0001704 A1* 1/2016 Nakasho .............. G07C 5/0891
701/36
2017/0297491 A1* 10/2017 Tanaka ...................... B60R 1/00
2018/0229657 A1* 8/2018 Yamamoto ................ B60R 1/00

FOREIGN PATENT DOCUMENTS

| JP | 2007-318460 | | 12/2007 |
| JP | 2007318460 A | * | 12/2007 |
| JP | 2015-106777 | | 6/2015 |
| JP | 2015106777 A | * | 6/2015 |

* cited by examiner

BIRD'S-EYE VIEW VIDEO GENERATION DEVICE, BIRD'S-EYE VIEW VIDEO GENERATION METHOD AND NON-TRANSITORY STORAGE MEDIUM

CROSS-REFERENCE TO RELATED APPLICATION

The present application claims priority to and incorporates by reference the entire contents of Japanese Patent Application No. 2017-039675 filed in Japan on Mar. 2, 2017.

FIELD

The present application relates to a bird's-eye view video generation device, a bird's-eye view video generation system, a bird's-eye view video generation method and a non-transitory storage medium.

BACKGROUND

A technology of capturing videos of surroundings of a vehicle with cameras that are arranged around the vehicle and displaying, on a monitor, a bird's-eye view video obtained by performing viewpoint conversion processing on the captured videos and synthesizing the captured videos is known (see, for example, Japanese Laid-open Patent Publication No. 2007-318460, Japanese Laid-open Patent Publication No. 2007-266930 and Japanese Laid-open Patent Publication No. 2015-106777). Japanese Laid-open Patent Publication No. 2007-318460 discloses a technology of, when a change in an inclination of a road surface is detected, correcting a distortion occurring in a video of a bird's-eye view from above. Japanese Laid-open Patent Publication No. 2007-266930 and Japanese Laid-open Patent Publication No. 2015-106777 disclose technologies of sensing an inclination of cameras, correcting the inclination of the cameras, and performing synthesizing.

In a case where a point right above a vehicle is set for a virtual viewpoint, when the road surface is inclined and thus the vehicle is also inclined, the virtual viewpoint is also inclined to a vertical direction together with the vehicle. In a generated bird's-eye view video, signs and structures built along the vertical direction are displayed as being inclined. For this reason, when a driver tries to check the surroundings of his/her vehicle by using the bird's-eye view video, the driver may feel something odd.

SUMMARY

A bird's-eye view video generation device, a bird's-eye view video generation system, a bird's-eye view video generation method and a non-transitory storage medium are disclosed.

According to one aspect of the present application, there is provided a bird's-eye view video generation device comprising a video data acquisition unit configured to acquire surroundings video data obtained by capturing videos of surroundings of a vehicle, an inclination data acquisition unit configured to acquire inclination data representing an inclination of the vehicle, a bird's-eye view video generator configured to perform viewpoint conversion processing on the videos of the surroundings of the vehicle acquired by the video data acquisition unit using a virtual viewpoint at which the vehicle is looked down from above and synthesize the converted videos of the surroundings of the vehicle to generate a bird's-eye view video, and a controller configured to cause the bird's-eye view video generator to perform the viewpoint conversion processing on the videos of the surroundings of the vehicle acquired by the video data acquisition unit using the virtual viewpoint whose position is adjusted based on the inclination data acquired by the inclination data acquisition unit and synthesize the converted videos of the surroundings of the vehicle to generate the bird's-eye view video.

According to one aspect of the present application, there is provided a bird's-eye view video generation method comprising acquiring surroundings video data obtained by capturing videos of surroundings of a vehicle, acquiring inclination data representing an inclination of the vehicle, generating a bird's-eye view video by performing viewpoint conversion processing on the acquired videos of the surroundings of the vehicle using a virtual viewpoint at which the vehicle is looked down from above and synthesize the converted videos of the surroundings of the vehicle, and controlling to further generate the bird's-eye view video by performing the viewpoint conversion processing on the acquired videos of the surroundings of the vehicle using the virtual viewpoint whose position is adjusted based on the acquired inclination data and synthesizing the converted videos of the surroundings of the vehicle by the generating.

According to one aspect of the present application, there is provided a non-transitory storage medium that stores program that causes a computer as a bird's-eye view video generation device to perform a process comprising acquiring surroundings video data obtained by capturing videos of surroundings of a vehicle, acquiring inclination data representing an inclination of the vehicle, generating a bird's-eye view video by performing viewpoint conversion processing on the acquired videos of the surroundings of the vehicle using a virtual viewpoint at which the vehicle is looked down from above and synthesize the converted videos of the surroundings of the vehicle, and controlling to further generate the bird's-eye view video by performing the viewpoint conversion processing on the acquired videos of the surroundings of the vehicle using the virtual viewpoint whose position is adjusted based on the acquired inclination data and synthesizing the converted videos of the surroundings of the vehicle by the generating.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

With reference to accompanying drawings, embodiments of a bird's-eye view video generation device 40, a bird's-eye view video generation system 1, a bird's-eye view video generation method and a non-transitory storage medium according to the present application will be described in detail below. The following embodiments do not limit the application.

The bird's-eye view video generation system 1 adjusts a position of a virtual viewpoint P according to an inclination of a vehicle V, generates a bird's-eye view video that is like a top-down view of the vehicle V from the virtual viewpoint P above the vehicle V, and displays the bird's-eye view video on a monitor 30.

The bird's-eye view video generation system 1 is mounted on the vehicle V. The bird's-eye view video generation system 1 may be a device mounted on the vehicle V or one portable and usable in the vehicle V.

Figure 1:
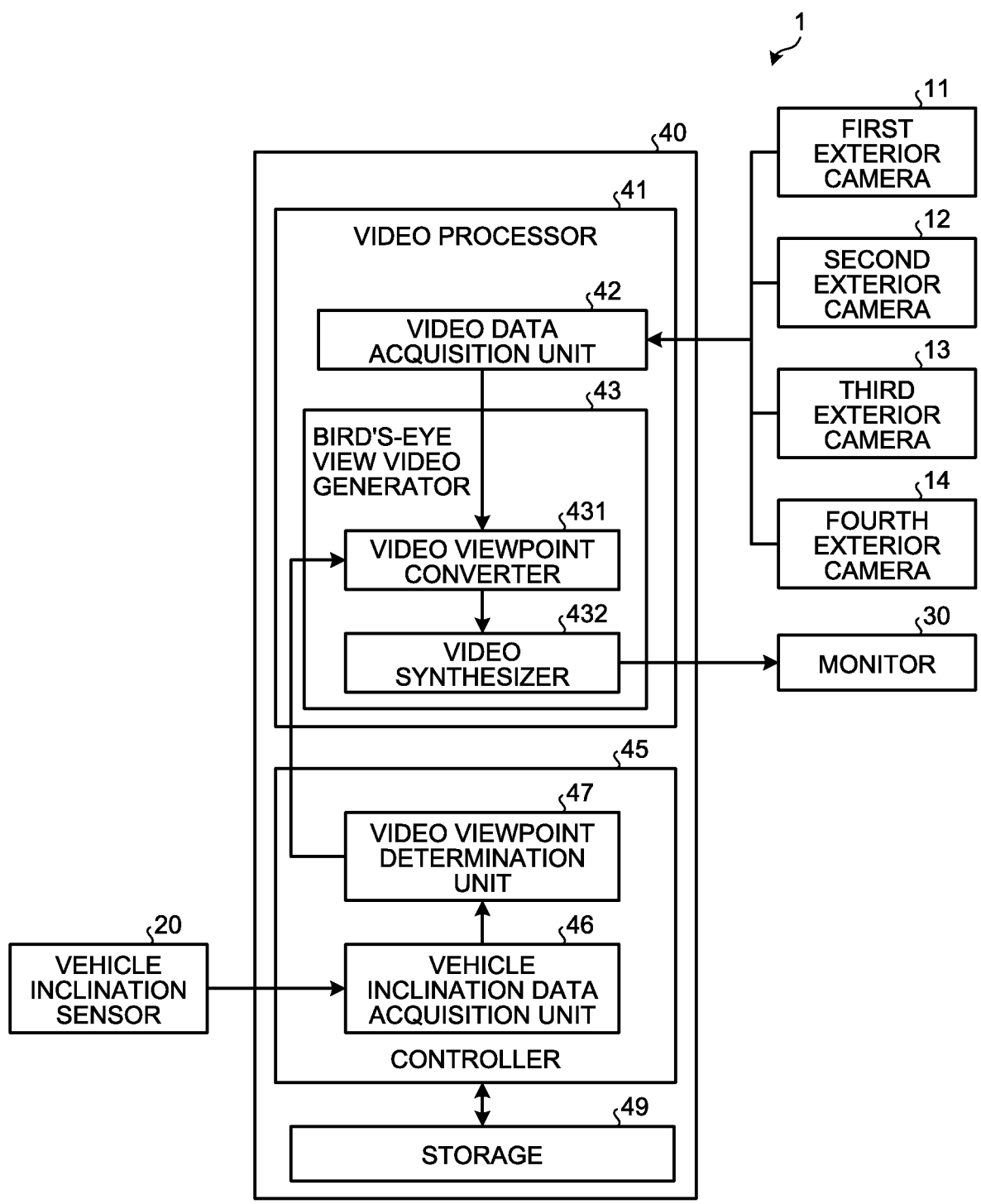
FIG. 1 is a block diagram illustrating an exemplary configuration of a bird's-eye view video generation system according to an embodiment.

The bird's-eye view video generation system 1 will be described with reference to FIG. 1. FIG. 1 is a block diagram illustrating an exemplary configuration of the bird's-eye view video generation system according to the embodiment. The bird's-eye view video generation system 1 includes a first exterior camera (camera) 11, a second exterior camera (camera) 12, a third exterior camera (camera) 13, a fourth exterior camera (camera) 14, a vehicle inclination sensor (sensor) 20, the monitor (display) 30, and the bird's-eye view video generation device 40.

The first exterior camera 11 is arranged on the front of the vehicle V and captures a video of surroundings around the front of the vehicle V. The first exterior camera 11 captures a video of, for example, an imaging area of approximately 180°. The first exterior camera 11 outputs the captured video to a video data acquisition unit 42 of the bird's-eye view video generation device 40.

The second exterior camera 12 is arranged on the rear of the vehicle V and captures a video of surroundings around the rear of the vehicle V. The second exterior camera 12 captures a video of, for example, an imaging area of approximately 180°. The second exterior camera 12 outputs the captured video to the video data acquisition unit 42 of the bird's-eye view video generation device 40.

The third exterior camera 13 is arranged on the left side of the vehicle V and captures a video of surroundings around the left side of the vehicle V. The third exterior camera 13 captures a video of, for example, an imaging area of approximately 180°. The third exterior camera 13 outputs the captured video to the video data acquisition unit 42 of the bird's-eye view video generation device 40.

The fourth exterior camera 14 is arranged on the right side of the vehicle V and captures a video of surroundings around the right side of the vehicle V. The fourth exterior camera 14 captures a video of, for example, an imaging area of approximately 180°. The fourth exterior camera 14 outputs the captured video to the video data acquisition unit 42 of the bird's-eye view video generation device 40.

The first exterior camera 11, the second exterior camera 12, the third exterior camera 13, and the fourth exterior camera 14 capture a video of an entire surroundings around the vehicle V.

The vehicle inclination sensor 20 is a sensor that senses an inclination of the vehicle V. The vehicle inclination sensor 20 is a 3-axis gyro sensor that senses angular rates of the vehicle V. More specifically, the 3-axis gyro sensor includes a roll rate gyro, a pitch rate gyro, and a yaw rate gyro. The roll rate gyro senses a roll angular rate that is an angular rate of rotation about the front-rear direction of the vehicle. The pitch rate gyro senses a pitch angular rate that is an angular rate of rotation about the left-right direction of the vehicle V. The yaw rate gyro senses a yaw angular rate that is an angular rate of rotation about the vertical direction of the vehicle V. The 3-axis gyro sensor outputs the roll angular rate sensed by the roll rate gyro, the pitch angular rate sensed by the pitch rate gyro, and the yaw angular rate sensed by the yaw rate gyro as an angular rate signal to a vehicle inclination data acquisition unit 46 of the bird's-eye view video generation device 40.

The monitor 30 is, for example, a display including a liquid crystal display (LCD) or an organic electro-luminescence (EL) display. The monitor 30 displays a bird's-eye view video based on the video signal that is output from the bird's-eye view video generation device 40 of the bird's-eye view video generation system 1. The monitor 30 may be one dedicated to the bird's-eye view video generation system 1. For example, the monitor 30 may be shared with other systems including a navigation system. The monitor 30 is arranged in a position easily viewable by a driver of the vehicle.

The bird's-eye view video generation device 40 includes a video processor 41, a controller 45, and a storage 49.

The video processor 41 includes the video data acquisition unit 42 and a bird's-eye view video generator 43.

The video data acquisition unit 42 acquires surroundings video data obtained by capturing videos of the surroundings of the vehicle V. More specifically, the video data acquisition unit 42 acquires sets of the surroundings video data that are output by the first exterior camera 11, the second exterior camera 12, the third exterior camera 13 and the fourth exterior camera 14. The video data acquisition unit 42 outputs the acquired sets of surroundings video data to a video viewpoint converter 431 of the bird's-eye view video generator 43.

The bird's-eye view video generator 43 includes the video viewpoint converter 431 and a video synthesizer 432.

By performing viewpoint conversion processing on the sets of the surroundings video data acquired by the video data acquisition unit 42 and synthesizing the sets of the converted surroundings video data, the bird's-eye view video generator 43 generates a video viewed from the virtual viewpoint P above the vehicle V. More specifically, based on the sets of the surroundings video data obtained by capturing the videos with the first exterior camera 11, the second exterior camera 12, the third exterior camera 13 and the fourth exterior camera 14, the video viewpoint converter 431 generates a video obtained by performing viewpoint conversion processing from the virtual viewpoint P that is determined by a video viewpoint determination unit 47. Any known method may be used for a method of the video viewpoint conversion processing and the method is not limited. The video viewpoint converter 431 outputs the sets of the surroundings video data on which the viewpoint conversion processing has been performed to the video synthesizer 432.

The video synthesizer 432 cuts out predetermined areas from the sets of the surroundings video data on which the viewpoint conversion processing has been performed, synthesizes the predetermined areas, and generates a bird's-eye view video in which a vehicle icon image imitating a shape of the vehicle V viewed from the virtual viewpoint P is synthesized at the center.

More specifically, the video synthesizer 432 cuts out a first cut-out area corresponding to the front of the vehicle V from the surroundings video data of the first exterior camera 11 on which the viewpoint conversion processing has been performed. The first cut-out area is a frontward area from the front end of the vehicle V. The first cut-out area is a cut-out area of the surroundings video data on which the viewpoint conversion processing has been performed, which corresponds to the front of the vehicle contained in the bird's-eye view video.

The video synthesizer 432 cuts out a second cut-out area corresponding to the rear of the vehicle V from the surroundings video data of the second exterior camera 12 on which the viewpoint conversion processing has been performed. The second cut-out area is a rearward area from the rear end of the vehicle V. The second cut-out area is a cut-out area of the surroundings video data on which the viewpoint conversion processing has been performed, which corresponds to the rear of the vehicle contained in the bird's-eye view video.

The video synthesizer 432 cuts out a third cut-out area corresponding to the left side of the vehicle V of the surroundings video data from the third exterior camera 13 on which the viewpoint conversion processing has been performed. The third cut-out area is a leftward area from the left side of the vehicle V. The third cut-out area is a cut-out area of the surroundings video data on which the viewpoint conversion processing has been performed, which corresponds to the left side of the vehicle contained in the bird's-eye view video.

The video synthesizer 432 cuts out a fourth cut-out area corresponding to the right side of the vehicle V from the surroundings video data from the fourth exterior camera 14 on which the viewpoint conversion processing has been performed. The third cut-out area is a rightward area from the right side of the vehicle V. The fourth cut-out area is a cut-out area of the surroundings video data on which the viewpoint conversion processing has been performed, which corresponds to the right side of the vehicle contained in the bird's-eye view video.

The video synthesizer 432 synthesizes the cut-out videos and generates the bird's-eye view video in which the vehicle icon is synthesized at the center. The video synthesizer 432 displays the generated bird's-eye view video on the monitor 30.

The controller 45 is, for example, an arithmetic processing unit consisting of, for example, a central processing unit (CPU). The controller 45 loads a program that is stored in the storage 49 and executes commands contained in the program. The controller 45 includes the vehicle inclination data acquisition unit 46 and the video viewpoint determination unit 47.

The vehicle inclination data acquisition unit 46 acquires vehicle inclination data that is output from the vehicle inclination sensor 20. The vehicle inclination data acquisition unit 46 calculates a roll angle, a pitch angle and a yaw angle that indicate inclination of the vehicle V based on a roll angular rate, a pitch angular rate, and a yaw angular rate contained in the vehicle inclination data. The vehicle inclination data acquisition unit 46 outputs the vehicle inclination data including the roll angle, the pitch angle and the yaw angle to the video viewpoint determination unit 47.

The video viewpoint determination unit 47 adjusts the position of the virtual viewpoint P according to the inclination data that is acquired from the vehicle inclination data acquisition unit 46. The video viewpoint determination unit 47 adjusts the position of the virtual viewpoint P according to the roll angle, the pitch angle and the yaw angle. The video viewpoint determination unit 47 outputs the determined position of the virtual viewpoint P to the video viewpoint converter 431.

When it is determined that the vehicle V is not inclined based on the inclination data acquired by the vehicle inclination data acquisition unit 46, the video viewpoint determination unit 47 sets a position on a vertical line to a reference plane of the vehicle V as the virtual viewpoint P1. For example, when the amount of change in the roll angle, the pitch angle, and the yaw angle with respect to the roll angle, the pitch angle and the yaw angle in a situation where the vehicle V contacts with a horizontal road surface is zero, the video viewpoint determination unit 47 determines that the vehicle V is not inclined.

The situation where the vehicle V is not inclined refers to a situation where the vehicle V contacts with a horizontal road surface. In this case, a plane of the vehicle which is horizontal to the road surface, such as a floor surface of the vehicle V, is referred to as a reference plane.

Figure 2:
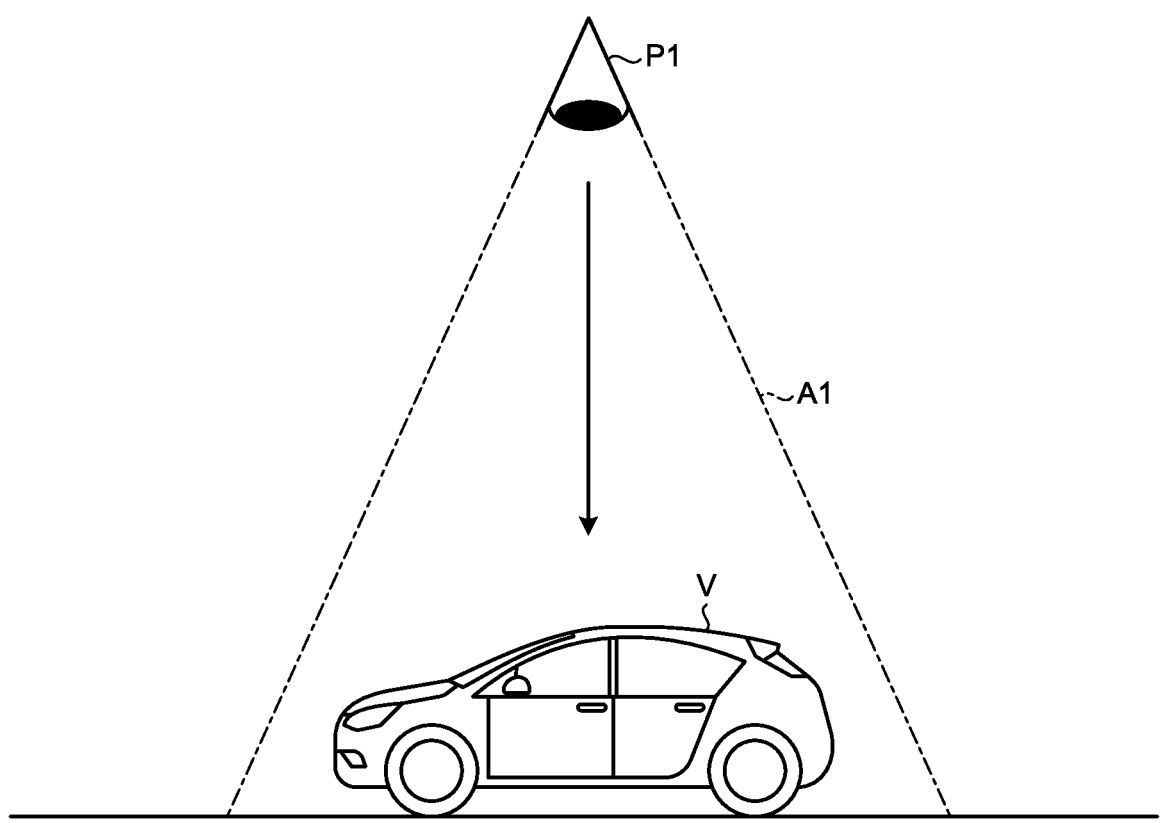
FIG. 2 is a schematic diagram illustrating the position of a virtual viewpoint of the bird's-eye view video generation system according to the embodiment.

With reference to FIG. 2, the virtual viewpoint P1 on the situation in which the vehicle V contacts with a horizontal road surface will be described. FIG. 2 is a schematic diagram illustrating the position of a virtual viewpoint of the bird's-eye view video generation system according to the embodiment. The virtual viewpoint P1 is positioned vertically above the road surface. The virtual viewpoint P1 is positioned right above the vehicle V, that is, above the center of the vehicle V. The center of the vehicle is a center in the direction of the width of the vehicle V and a center in the front-rear direction of the vehicle V. The position right above the vehicle V is positioned on the vertical line to the reference plane of the vehicle V. The virtual viewpoint P1 is a viewpoint that looks down the vehicle V from the position right above the center of the vehicle. The reference number A1 denotes a display area of a bird's-eye view video 100 (see FIG. 5) that is generated by performing the viewpoint conversion processing using the virtual viewpoint P1.

When it is determined that the vehicle V is inclined based on the inclination data acquired by the vehicle inclination data acquisition unit 46, the video viewpoint determination unit 47 sets a position vertically above the vehicle V as the virtual viewpoint P2. For example, when the amount of change in the roll angle, the pitch angle and the yaw angle with respect to the roll angle, the pitch angle and the yaw angle in the situation where the vehicle V contacts with the horizontal road surface is not zero, the video viewpoint determination unit 47 determines that the vehicle V is inclined.

The situation where the vehicle V is inclined refers to the situation where the vehicle V contacts with a inclined road surface.

Figure 3:
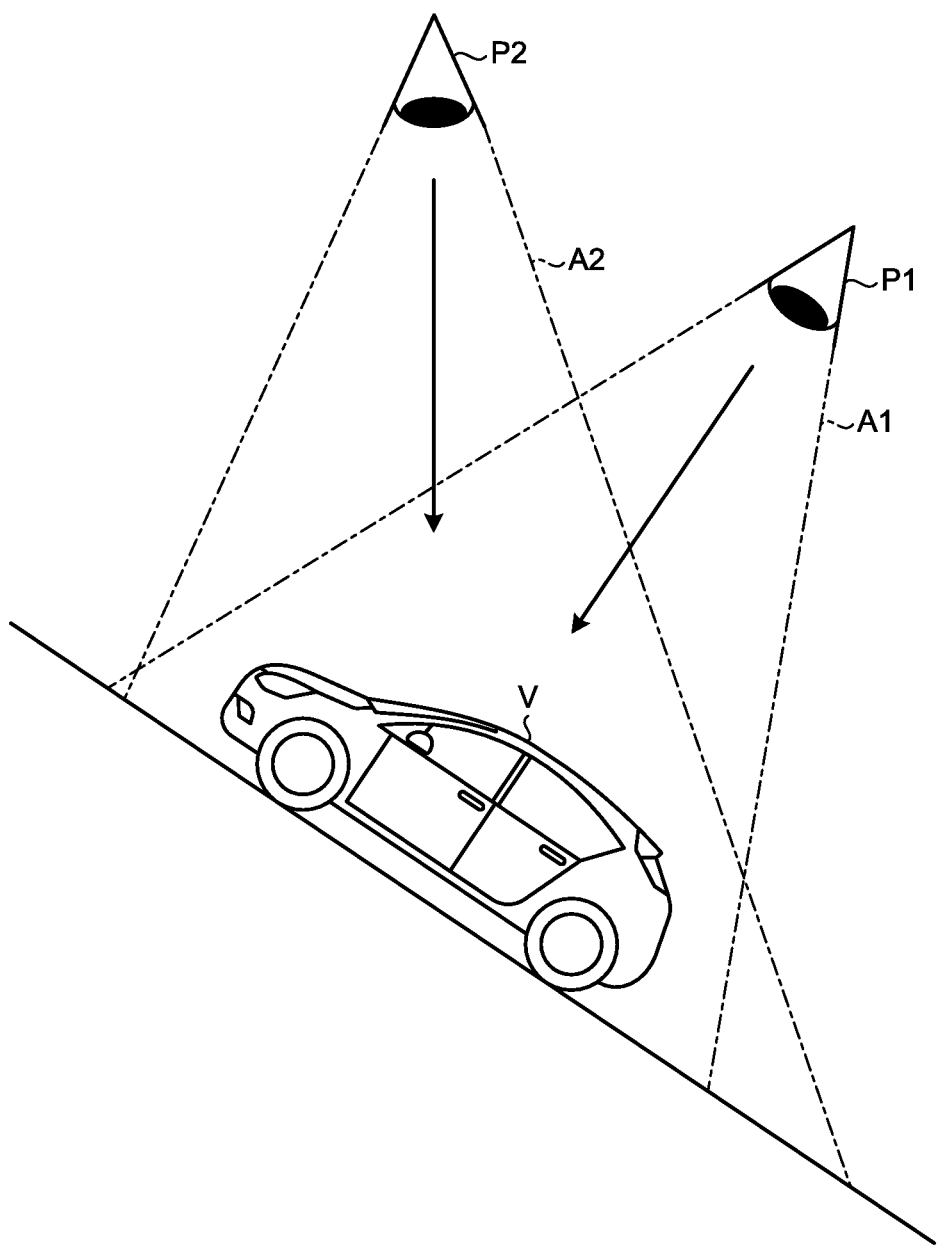
FIG. 3 is a schematic diagram illustrating the positions of virtual viewpoints of the bird's-eye view video generation system according to the embodiment.

With reference to FIG. 3, the virtual viewpoint P2 in the situation where the vehicle V contacts with the inclined road surface will be described. FIG. 3 is a schematic diagram illustrating the positions of virtual viewpoints of the bird's-eye view video generation system according to the embodiment. The vehicle V is oriented such that the front side is on the upper side of the inclined road surface and the rear side is on the lower side of the inclined road surface. The virtual viewpoint P2 is positioned above the vertical direction passing through the center of the vehicle V. The virtual viewpoint P2 is a viewpoint that looks down the vehicle V from above vertically. The reference number A1 represents the display area of the bird's-eye view video 100 that is generated by performing the viewpoint conversion processing using the virtual viewpoint P1. The reference number A2 represents the display area of a bird's-eye view video 110 (see FIG. 6) that is generated by performing the viewpoint conversion processing using the virtual viewpoint P2. The display area A2 of the bird's-eye view video 110 for the virtual viewpoint P2 includes wider area for the rear of the vehicle V than the display area A1 of the bird's-eye view video 100 for the virtual viewpoint P1.

The video viewpoint determination unit 47 may calculate an average value of the inclination of the vehicle V for a predetermined time based on the inclination data acquired by the vehicle inclination data acquisition unit 46, and, based on the calculated average value of the inclination of the vehicle V, determine whether the vehicle V is inclined. Accordingly, the position of the virtual viewpoint P is adjusted properly.

The video viewpoint determination unit 47 may determine that the vehicle V is inclined only when the inclination of the vehicle is equal to or larger than a predetermined value based on the inclination data acquired by the vehicle inclination data acquisition unit 46. This inhibits the position of the virtual point P from changing unnecessarily due to small irregularities of the road surface.

The storage 49 stores data necessary for various types of processing performed by the bird's-eye view video generation device 40 and results of the various types of processing. The storage unit 49 is, for example, a semiconductor memory device, such as a random access memory (RAM), a read only memory (ROM) or a flash memory, or a storage device, such as a hard disk device or an optical disk.

Figure 4:
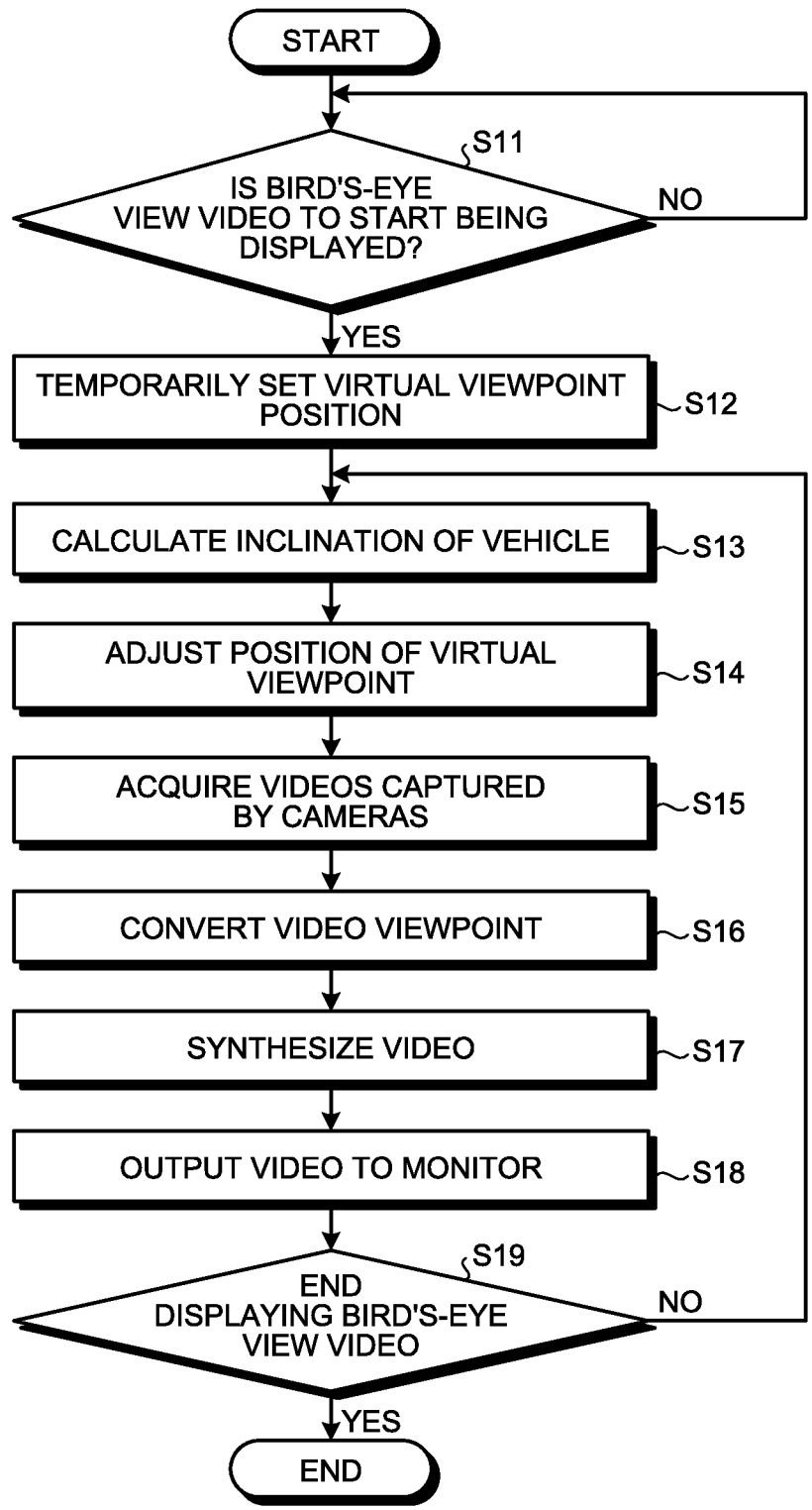
FIG. 4 is a flowchart illustrating a flow of processes performed by the bird's-eye view video generation system according to the embodiment.

With reference to FIG. 4, a flow of the processes performed by the bird's-eye view video generation device 40 of the bird's-eye view video generation system 1 will be described. FIG. 4 is a flowchart illustrating the flow of the processes performed by the bird's-eye view video generation system according to the first embodiment. The embodiment exemplifies that the bird's-eye view video is displayed when the vehicle V is reversed.

The controller 45 determines whether to start displaying a bird's-eye view video (step S11). In the embodiment, the controller 45 determines whether to start displaying a bird's-eye view video based on presence or absence of a reverse trigger. The reverse trigger refers to, for example, a change of the shift position to the "reverse" position. The reverse trigger refers to a change of the direction in which the vehicle V is driven to the rearward direction with respect to the vehicle V. When the reverse trigger is absent, the controller 45 determines not to start displaying a bird's-eye view video (NO at step S11) and executes the process at step S11 again. When the reverse trigger is present, the controller 45 determines to start displaying a bird's-eye view video (YES at step S11) and proceeds to step S12. The trigger to start displaying a bird's-eye view video is not limited to the reverse trigger, and any trigger, such as a user operation, an obstacle detection result or a stop, may be used.

The controller 45 temporarily sets the position of a virtual viewpoint P (step S12). More specifically, the controller 45 sets an upper position in a direction vertical to the road surface with which the vehicle V contacts as the virtual viewpoint P1. The controller 45 then proceeds to step S13.

The controller 45 calculates the inclination of the vehicle (step S13). More specifically, the controller 45 causes the vehicle inclination data acquisition unit 46 to calculate a roll angle, a pitch angle and a yaw angle indicating the inclination of the vehicle V based on the acquired inclination data. The controller 45 then proceeds to step S14.

The controller 45 adjusts the position of the virtual viewpoint P (step S14). More specifically, the controller 45 causes the video viewpoint determination unit 47 to adjust the position of the virtual viewpoint P according to the inclination of the vehicle V. When it is determined that the vehicle V is inclined, the controller 45 causes the video viewpoint determination unit 47 to set a position vertically above the vehicle V as the virtual viewpoint P2. When it is determined that the vehicle V is not inclined, the controller 45 causes the video viewpoint determination unit 47 to set the upper position in the direction vertical to the road surface that the vehicle V contacts with as the virtual viewpoint P1, which has been temporarily set in step S12. The controller 45 then proceeds to step S15.

The controller 45 acquires videos captured by the cameras (step S15). More specifically, the controller 45 causes the video data acquisition unit 42 to acquire sets of the surroundings video data that are output by the first exterior camera 11, the second exterior camera 12, the third exterior camera 13 and the fourth exterior camera 14. The controller 45 then proceeds to step S16.

The controller 45 converts the video viewpoint (step S16). More specifically, the controller 45 causes the video viewpoint converter 431 to generate a video obtained by performing the viewpoint conversion processing using the virtual viewpoint P, which is adjusted at step S14, on the acquired sets of the surroundings video data. The controller 45 then proceeds to step S17.

The controller 45 synthesizes videos (step S17). More specifically, the controller 45 causes the video synthesizer 432 to cut out videos of predetermined areas from the sets of the surroundings video data on which the viewpoint conversion processing has been performed and synthesizes the videos. The controller 45 causes the video synthesizer 432 to synthesize a vehicle icon image at the center of the synthesized video and generates a bird's-eye view video. The controller 45 then proceeds to step S18.

The controller 45 outputs the video to the monitor 30 (step S18). More specifically, the controller 45 causes the monitor 30 to display the generated bird's-eye view video 100 or the bird's-eye view video 110 that is generated by the video synthesizer 432. The controller 45 then proceeds to step S19.

The controller 45 determines whether to end displaying the bird's-eye view video (step S19). More specifically, the controller 45 determines whether to end displaying the bird's-eye view video based on presence or absence of reverse end trigger. The reverse end trigger refers to, for example, the change of the shift position from the "reverse" position to another position. When the reverse end trigger is present, the controller 45 determines to end displaying the bird's-eye view video (YES at step S19) and ends the process. When the reverse end trigger is absent, the controller 45 determines not to end displaying the bird's-eye view video (NO at step S19) and returns to step S13 to execute the process again.

Figure 5:
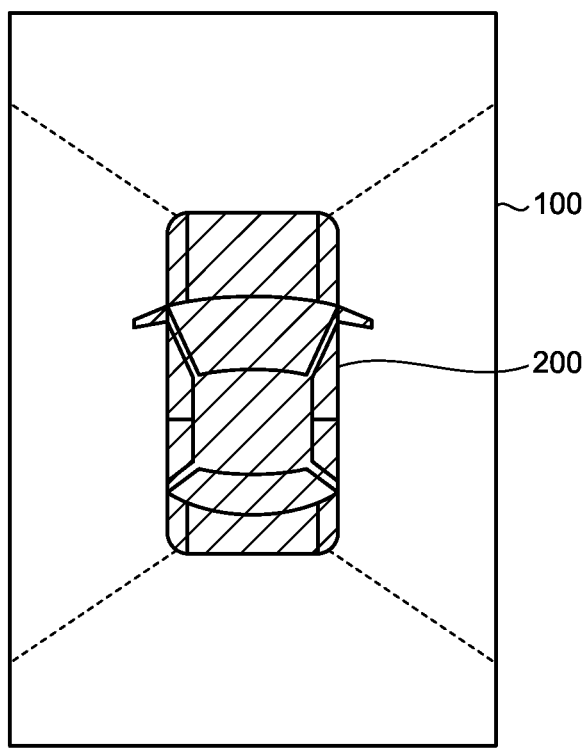
FIG. 5 is a diagram illustrating an exemplary bird's-eye view video that is generated by the bird's-eye view video generation system according to the embodiment.

With reference to FIG. 5, the bird's-eye view video 100 generated by the bird's-eye view video generation system 1 will be described. FIG. 5 is a diagram illustrating an exemplary bird's-eye view video generated by the bird's-eye view video generation system according to the embodiment. The bird's-eye view video 100 is a video that is generated by performing, when the vehicle V contacts with a horizontal road surface, the viewpoint conversion processing using the virtual viewpoint P1 corresponding to the upper position in the direction vertical to the road surface with which the vehicle V contacts. A vehicle icon image 200 represents the vehicle V looked down from right above.

Figure 6:
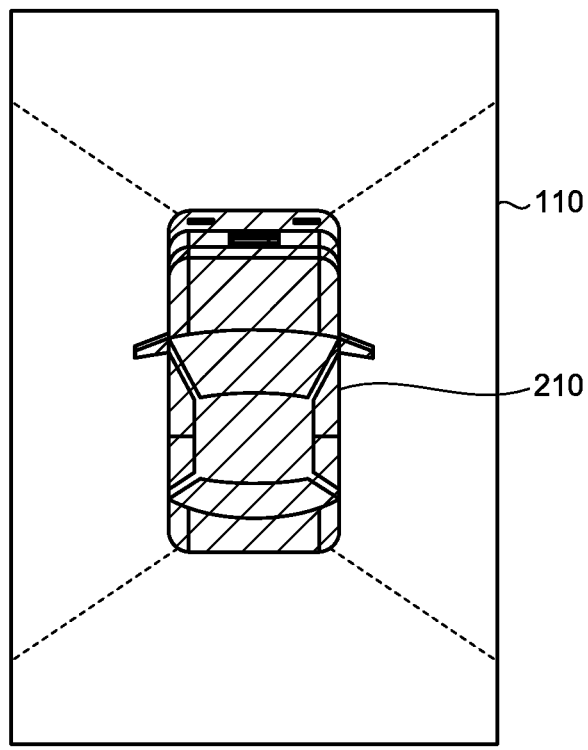
FIG. 6 is a diagram illustrating another exemplary bird's-eye view video that is generated by the bird's-eye view video generation system according to the embodiment.

With reference to FIG. 6, the bird's-eye view video 110 generated by the bird's-eye view video generation system 1 will be described. FIG. 6 is a diagram illustrating another exemplary bird's-eye view video generated by the bird's-eye view video generation system according to the embodiment. The bird's-eye view video 110 is a video that is, when the vehicle V contacts with the inclined road surface, generated by performing the viewpoint conversion processing using the virtual viewpoint P2 corresponding to the position vertically above the vehicle V. A vehicle icon image 210 represents the vehicle V looked down obliquely from the position vertically above the vehicle V.

It is preferable that the vehicle icon image 210 be displayed such that no blind spot is caused in the bird's-eye view video 110 by the vehicle icon image 210. For example, the vehicle icon image 210 may be semi-transparent. For example, the vehicle icon image 210 may show a frame representing the outer shape.

As described above, the bird's-eye view video generation system 1 generates the bird's-eye view video 100 or the bird's-eye view video 110 that is synthesized by performing the viewpoint conversion processing using the virtual viewpoint P whose position is adjusted according to the inclination of the vehicle V.

As described above, in the embodiment, the bird's-eye view video 100 or the bird's-eye view video 110 that is synthesized by adjusting the virtual viewpoint P according to the inclination of the vehicle V and performing the viewpoint conversion processing is generated. In the embodiment, when the vehicle V is inclined, the viewpoint conversion processing using the virtual viewpoint P2 corresponding to the position vertically above the vehicle V is performed and the bird's-eye view video 110 is generated. Accordingly, according to the embodiment, it is possible to display the bird's-eye view video 100 or the bird's-eye view video 110 that displays a video close to field of view of the driver without depending on the inclination of the vehicle V.

In the case where the vehicle V is inclined, when the position of the virtual viewpoint P is not adjusted and the viewpoint conversion processing using the virtual viewpoint P1 illustrated in FIG. 3 is performed to generate the bird's-eye view video 100, the virtual viewpoint P1 is positioned along a direction different from the vertical direction. For this reason, in the bird's-eye view video 100, signs and structures that are built along the vertical direction are displayed as being inclined. When the driver checks the surroundings of the vehicle V by the bird's-eye view video 100, the driver may feel something odd.

On the other hand, in the case where the vehicle V is inclined, when the position of the virtual viewpoint P is adjusted and the virtual viewpoint P2 illustrated in FIG. 3 is used to generate the bird's-eye view video 110, the virtual viewpoint P2 is positioned in the direction along the vertical direction. For this reason, in the bird's-eye view video 110, the signs and structures that are built along the vertical direction are displayed as being built vertically. When the driver checks the surroundings of the vehicle V by the bird's-eye view video 110, the driver does not feel something odd because the surroundings are displayed as the scenery viewed by the driver.

As described above, according to the embodiment, even when the vehicle V is inclined, it is possible to display the bird's-eye view video 100 or the bird's-eye view video 110 that are displayed as the scenery viewed by the driver.

Furthermore, according to the embodiment, as the form of the vehicle icon image changes according to the inclination of the vehicle V, it is possible to display the bird's-eye view video 110 that is more easy to be recognized. According to the embodiment, it is possible to easily recognize that the position of the virtual viewpoint P2 has been changed from that of the virtual viewpoint P1 in the bird's-eye view video 110.

The bird's-eye view video generation system 1 according to the present application has been described; however, the present application may be carried out in various different modes in addition to the above-described embodiment.

The components of the bird's-eye view video generation system 1 illustrated in the drawings are functional ideas and need not to be configured physically as illustrated in the drawings. In other words, the specific mode of each device is not limited to that illustrated in the drawings. All or part of the devices may be distributed or integrated functionally or physically according to any unit and according to processing load on each device or situation in which the device is used.

The configuration of the bird's-eye view video generation system 1 is implemented by a program that is loaded as software into a memory. In the embodiment, the configuration has been described as functional blocks implemented by association among sets of hardware or software. In other words, the functional blocks may be implemented with only hardware or only software or in various forms, such as a combination of hardware and software.

The above-described components include those easily achieved by those skilled in the art and those substantially the same as the above-described components. Furthermore, the above-described components may be combined as appropriate. Furthermore, it is possible to make various types of omission, replacement or change among the components within the scope of the application.

The embodiment illustrates the case where the pitch angle of the vehicle V changes; however, the embodiments are not limited thereto. The application may be applied to the case where the roll angle of the vehicle V changes.

Figure 7:
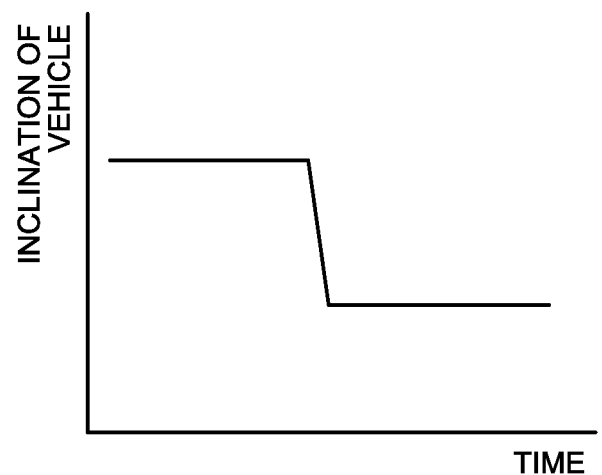
FIG. 7 is a graph illustrating an exemplary change in an inclination of a vehicle over time.

As illustrated in FIG. 7, at step S14, when the inclination of the vehicle V suddenly changes and becomes constant soon, no adjustment may be made on the position of the virtual viewpoint P. FIG. 7 is a graph illustrating an exemplary change in the inclination of the vehicle over time. When the inclination of the vehicle V changes as illustrated in FIG. 7, for example, it is assumed that the vehicle V runs on a small step or that the rising slope changes to the descending slope at the top of a slope. As described above, when the inclination of the vehicle V suddenly changes and then becomes stable soon, it is preferable not to adjust the position of the virtual viewpoint P to prevent the situation where the position of the virtual viewpoint P is adjusted unexpectedly or the position of the virtual viewpoint P is adjusted suddenly and thereby the visibility of the display to the driver lowers.

The video viewpoint determination unit 47 has been described as one that, when it is determined that the vehicle V is inclined, set the position vertically above the vehicle V as the virtual viewpoint P2; however, the embodiments are not limited thereto. When it is determined that the vehicle V is inclined, the video viewpoint determination unit 47 may adjust the position of the virtual viewpoint P1 according to the roll angle, the pitch angle and the yaw angle indicating the inclination of the vehicle V as the virtual viewpoint P2. More specifically, the video viewpoint determination unit 47 may calculate the virtual viewpoint P2 by adjusting the position of the virtual viewpoint P1 depending on the amount of the change of the roll angle, the pitch angle and the yaw angle of the vehicle V with respect to those in the situation where the vehicle contacts with the horizontal road surface.

The controller 45 may determine whether to start displaying the bird's-eye view video according to whether an operation of starting displaying the bird's-eye view video on an operation unit is detected.

According to the present application, the surroundings of the vehicle is displayed appropriately when the road surface is inclined.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device comprising:
    multiple cameras configured to acquire surroundings video data obtained by capturing videos of surroundings of a vehicle;
    an inclination sensor configured to acquire inclination data representing an inclination of the vehicle to a vertical direction;
    a memory that is configured to store computer executable instructions; and
    a processor that is configured to execute the computer executable instructions to perform operations, comprising:
    performing viewpoint conversion processing on the videos of the surroundings of the vehicle acquired by the multiple cameras using a virtual viewpoint at which the vehicle is looked down from above and synthesize the converted videos of the surroundings of the vehicle to generate a bird's-eye view video;
    performing the viewpoint conversion processing on the videos of the surroundings of the vehicle acquired by the multiple cameras using the virtual viewpoint whose position is adjusted based on the inclination data acquired by the inclination sensor and synthesize the converted videos of the surroundings of the vehicle to generate the bird's-eye view video, and
    setting, when the vehicle is determined to be inclined to the vertical direction based on the inclination data, a position above the vehicle in the vertical direction passing through a center of the vehicle as the position for the virtual viewpoint based on the inclination data acquired by the inclination sensor.

2. The bird's-eye view video generation device according to claim 1, wherein the computer executable instructions further comprise generating the bird's-eye view video containing a vehicle icon image imitating the vehicle viewed from the position of the virtual viewpoint, a form of the vehicle icon image being changed according to the inclination data.

3. A bird's-eye view video generation method comprising:
    acquiring surroundings video data obtained by capturing videos of surroundings of a vehicle;
    acquiring inclination data representing an inclination of the vehicle to a vertical direction;
    generating a bird's-eye view video by performing viewpoint conversion processing on the acquired videos of the surroundings of the vehicle using a virtual viewpoint at which the vehicle is looked down from above and synthesize the converted videos of the surroundings of the vehicle;
    generating the bird's-eye view video by performing the viewpoint conversion processing on the acquired videos of the surroundings of the vehicle using the virtual viewpoint whose position is adjusted based on the acquired inclination data and synthesizing the converted videos of the surroundings of the vehicle by the generating; and
    setting, when the vehicle is determined to be inclined to the vertical direction based on the inclination data, a vertically above the vehicle in the vertical direction passing through a center of the vehicle as the position for the vehicle viewpoint based on the inclination data acquired by the inclination sensor.

4. A non-transitory storage medium that stores program that causes a computer as a bird's-eye view video generation device to perform a process comprising:
    acquiring surroundings video data obtained by capturing videos of surroundings of a vehicle to a vertical direction;
    acquiring inclination data representing an inclination of the vehicle;
    generating a bird's-eye view video by performing viewpoint conversion processing on the acquired videos of the surroundings of the vehicle using a virtual viewpoint at which the vehicle is looked down from above and synthesize the converted videos of the surroundings of the vehicle;
    generating the bird's-eye view video by performing the viewpoint conversion processing on the acquired videos of the surroundings of the vehicle using the virtual viewpoint whose position is adjusted based on the acquired inclination data and synthesizing the converted videos of the surroundings of the vehicle by the generating; and
    setting, when the vehicle is determined to be inclined to the vertical direction based on the inclination data, a position above the vehicle in the vertical direction passing through a center of the vehicle as the position for the virtual viewpoint based on the inclination data acquired by the inclination sensor.

* * * * *